H. G. SUTTON.
GAS FLASHING APPARATUS FOR SIGNS.
APPLICATION FILED NOV. 17, 1909.
965,545.
Patented July 26, 1910.
4 SHEETS—SHEET 1.
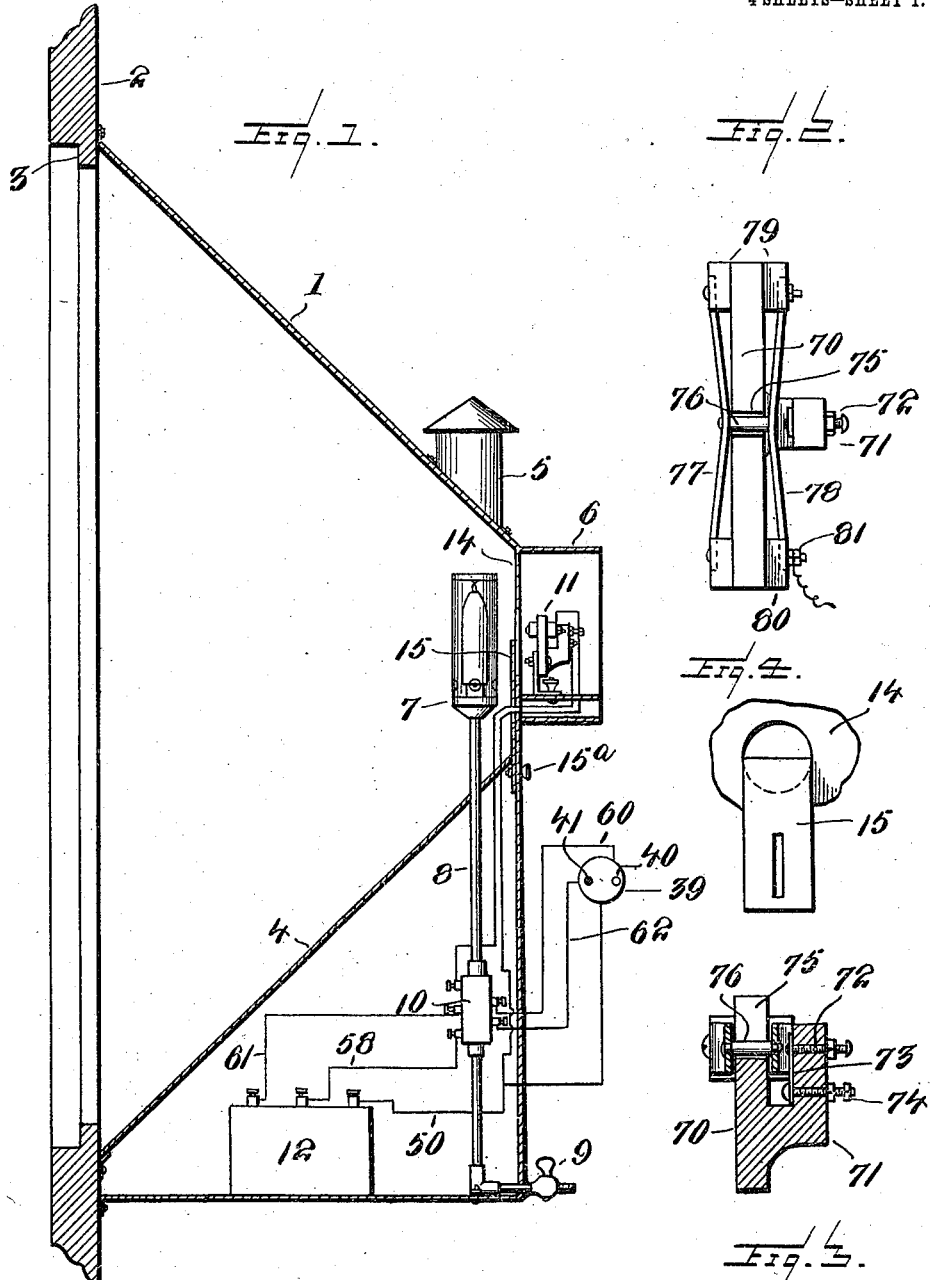

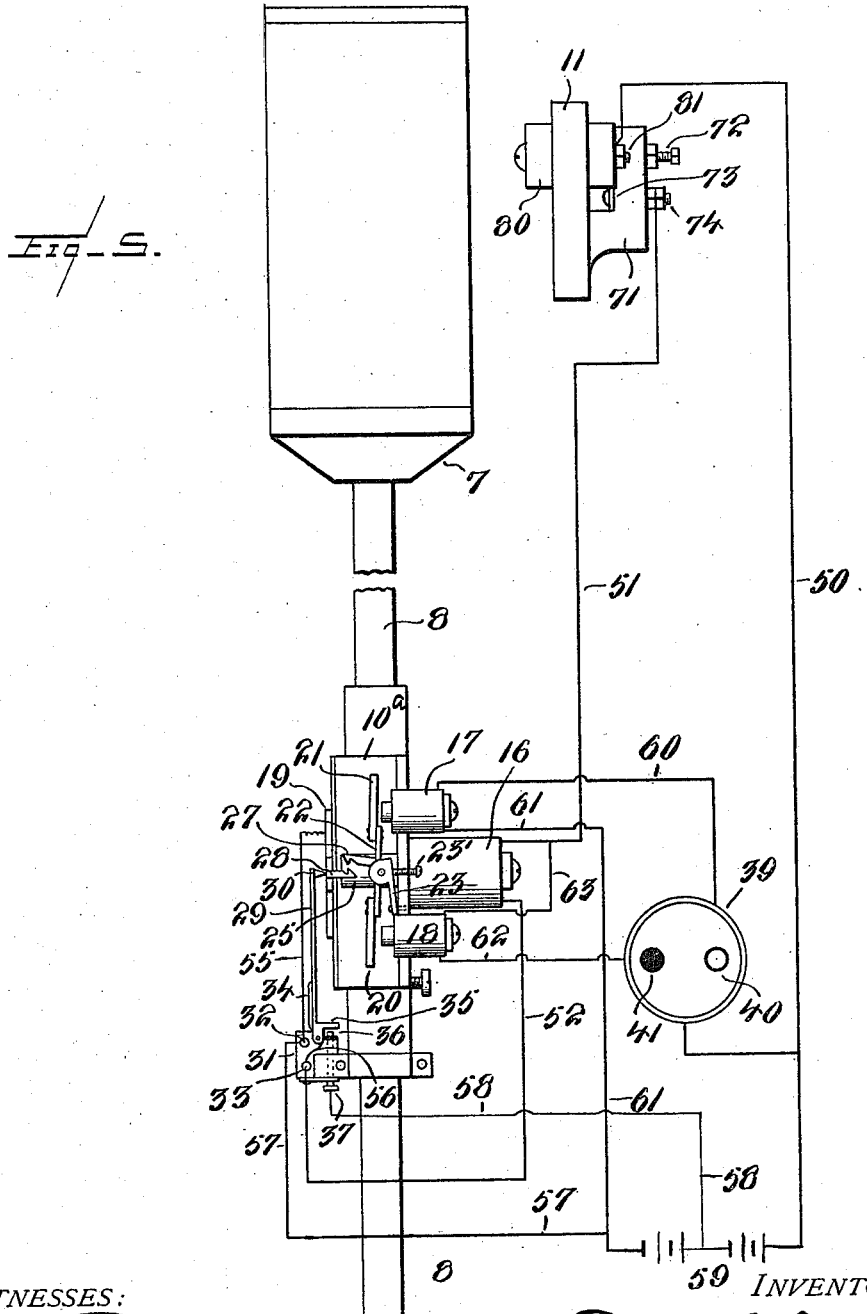

H. G. SUTTON.
GAS FLASHING APPARATUS FOR SIGNS.
APPLICATION FILED NOV. 17, 1909.

965,545.

Patented July 26, 1910.
4 SHEETS—SHEET 3.

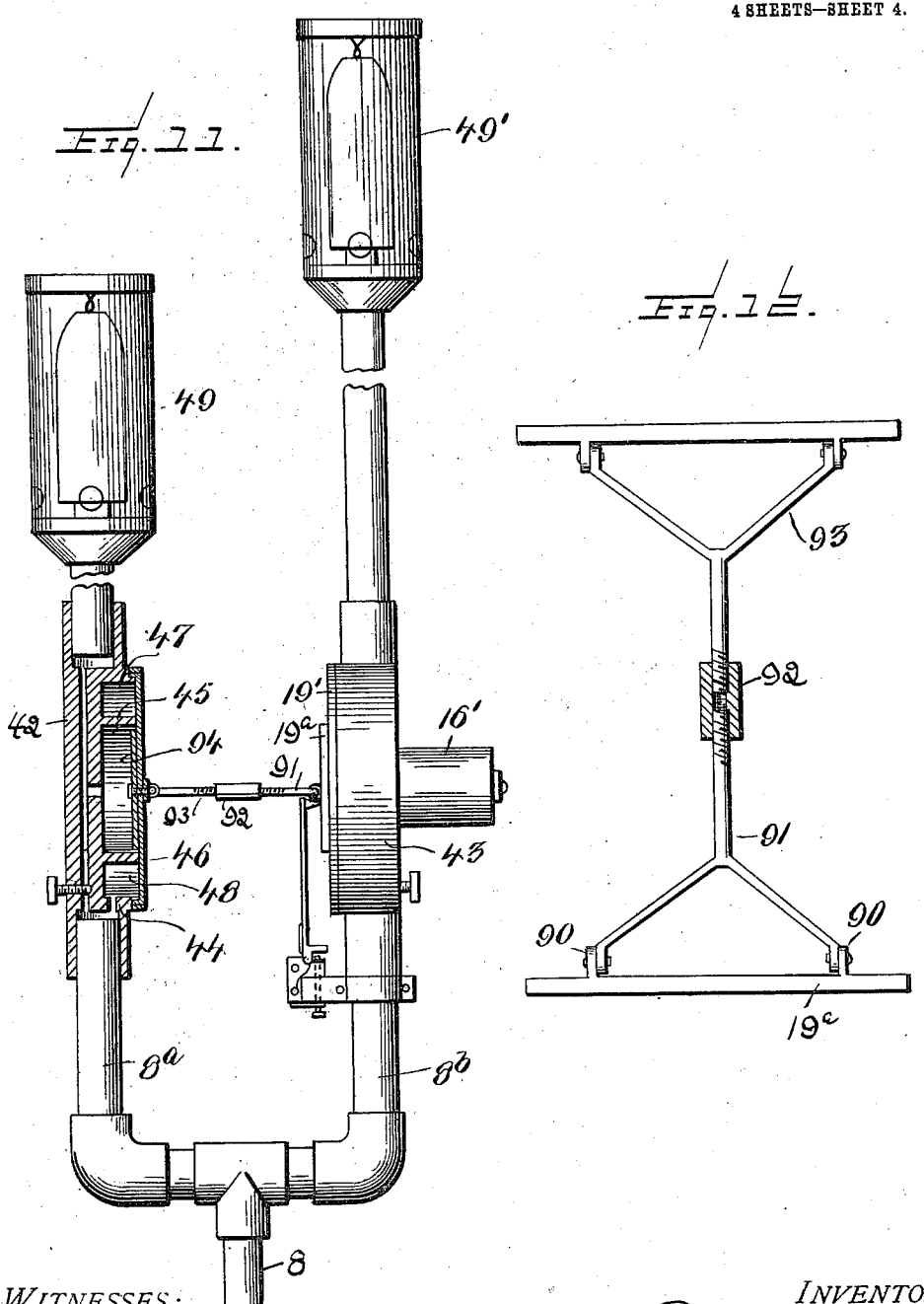

UNITED STATES PATENT OFFICE.

HENRY G. SUTTON, OF PHILADELPHIA, PENNSYLVANIA, ASSIGNOR OF SIXTY-FIVE ONE-HUNDREDTHS TO JOHN R. GILLETTE AND WALTER S. MOYER, OF PHILADELPHIA, PENNSYLVANIA.

GAS-FLASHING APPARATUS FOR SIGNS.

965,545.

Specification of Letters Patent. Patented July 26, 1910.

Application filed November 17, 1909. Serial No. 528,625.

*To all whom it may concern:*

Be it known that I, HENRY G. SUTTON, a citizen of the United States, residing at Philadelphia, in the county of Philadelphia and State of Pennsylvania, have invented certain new and useful Improvements in Gas-Flashing Apparatus for Signs; and I do hereby declare the following to be a full, clear, and exact description of the invention, such as will enable others skilled in the art to which it appertains to make and use the same.

This invention relates to gas flashing apparatus for signs.

The object of the invention is to provide a device for illuminating intermittently a sign used for advertising purposes, and especially to provide improved means for automatically increasing and diminishing the gas supply, such automatic means being under the control of a thermo-electric switch, and also being under the independent control of a device which may be operated electrically from a distant point.

A further object is to provide means whereby the electrically operated valve is retained in a given position (after first being operated) by the use of a minimum current.

With these objects in view the invention consists in the novel arrangement of parts hereinafter more fully described and claimed.

Figure 6:
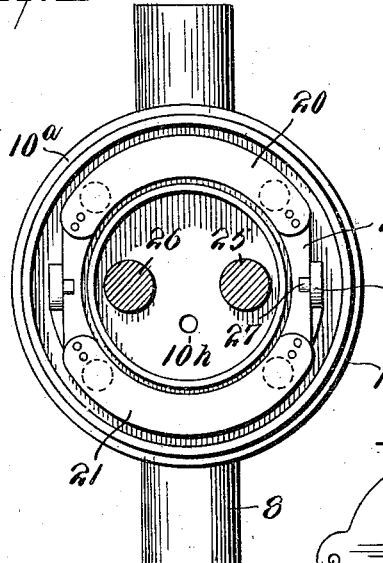
Figure 7:
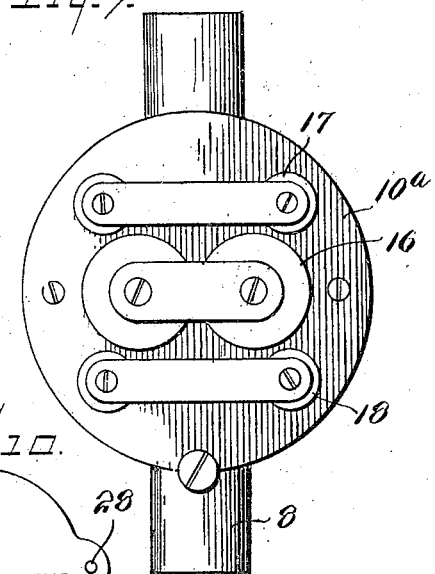
Figure 10:
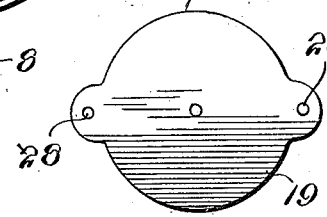
Figure 8:
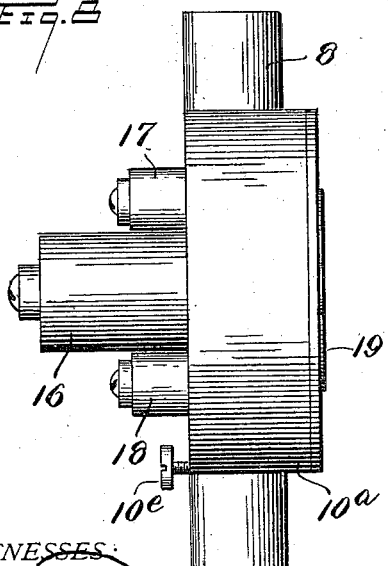
Figure 9:
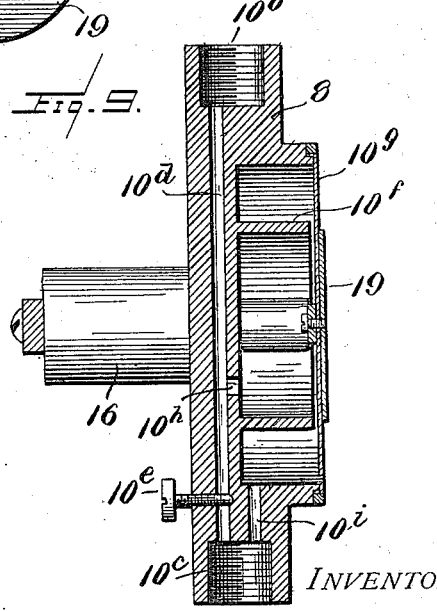

In the accompanying drawings:—Figure 1 is a view of the device in vertical section, the apparatus within the casing being shown in elevation. Fig. 2 is a top plan view of the thermo-electric switch, an end view of which appears in Fig. 1. Fig. 3 is a vertical section of the switch shown in Figs. 1 and 2. Fig. 4 is a detail view of a shutter separating that portion of the casing containing the thermo-electric switch from the burner. Fig. 5 is a diagrammatic view showing the arrangement of the circuits and their connection with the magnets employed in connection with the valve controlling the gas supply. Fig. 6 is a plan view of the casing containing certain of the operative parts of the valve. Fig. 7 is a top plan view of the casing showing the several magnets for operating the valve. Fig. 8 is a side elevation of the valve. Fig. 9 is a vertical section thereof. Fig. 10 shows a plate which in use is mounted on the diaphragm of the valve, and constitutes an armature for the principal magnets controlling the valve. Fig. 11 is a view in elevation of a modification in which two burners are employed. Fig. 12 is a detail view of the connection between the valves controlling the two burners shown in Fig. 11.

Referring to the drawings in detail, 1 and 4 indicate reflectors which constitute portions of a suitable casing, the front part of which comprises a frame 2 arranged to carry the sign proper in a recess 3 formed therein. The casing is provided with a ventilating device 5 and has projecting from the rear portion thereof an extension 6 for the accommodation of a thermo-electric switch 11. A burner 7 is mounted on a gas supply pipe 8 which is under the control of a key 9 at the lower portion of the casing. Connected with gas supply pipe 8 is an electrically controlled valve within casing 10, such valve being connected with a primary battery in casing 12. Between the switch 11 and the burner 7, a plate 14 provided with a central aperture is located, this aperture being under the control of a shutter 15 consisting of a plate the lower portion of which is provided with a slot for the accommodation of an adjusting screw 15$^a$. This shutter is shown in detail in Fig. 4.

The arrangement of the various circuits will be fully described hereinafter.

The thermo-electric switch consists of a rectangular member 70 of insulating material and having projecting therefrom an arm 71 of similar material in which is mounted an adjustable contact device 72 connected by plate 73 with a terminal or member 74. Member 70 is provided with a slot 75 through which a pin 76 passes, this pin being connected at the ends with metal strips 77 and 78, the ends of which are secured to blocks 79 and 80 connected with the ends of member 70. A terminal member 81 passes through the ends of strips 77 and 78 and current is conducted to such members 77 and 78 and thence to contact member 72 when the strip 78 is sufficiently expanded by heat from the burner.

A push button 39 is mounted at any convenient point so that a sign placed in a show window but more or less inaccessible for the time being, may be conveniently controlled at a distance. This push button is connected by means of wire 50 with the battery and the button 41 designed to cut off the flow of gas, is connected with certain magnets hereinafter referred to, by means of wire 62 while button 40 is connected with another set of magnets by means of wire 60.

The electrically controlled valve consists of a suitable casing $10^a$ which may be substantially circular in form, as shown in Figs. 6 and 7, such casing having passages therein for the gas and for the accommodation of the operative parts. The upper portion of the casing $10^b$ is arranged for connection with the gas supply pipe, and the lower portion $10^c$ is similarly arranged. A passageway $10^d$ connects the portions $10^b$ and $10^c$ and may be at all times partially open, the amount of gas passing through this portion of the casing being controlled by screw $10^e$. The passageway $10^d$ provides means for keeping the burner constantly supplied with the minimum amount of gas so that it may be in condition for fully illuminating the sign at any moment. The main portion of casing $10^a$ is divided into two chambers by an annular partition $10^f$, this partition terminating a short distance from the diaphragm $10^g$ when the latter is in its normal position. This construction is fully shown in Fig. 9. In the same figure the poles of one of the principal magnets 16 are shown in the central portion of the inner chamber of the casing, and this central portion has connection with passageway $10^d$ by means of an aperture $10^h$ in order that gas flowing through passageway $10^i$ and passing around partition $10^f$ may flow into passageway $10^d$ when the diaphragm is in its normal position. Connected with diaphragm $10^g$ is a plate 19 constituting an armature for the principal magnets 16 mounted on one side of the valve casing. The poles of these magnets are shown in Fig. 6 and are numbered respectively 25 and 26. Pole 25 also appears in the central portion of the casing in Fig. 5. Magnet 16 when excited by current passing from the battery and through the thermo-electric switch when closed by heat from the burner, attracts armature 19 causing the diaphragm to be deflected and thrown against partition $10^f$ thereby cutting off the principal flow of gas and rendering the sign practically dark.

In cutting off the supply of gas, current passes from battery 59, comprising two cells or groups of cells, through wire 50, switch 11, wire 51, magnet 16, wire 52, insulated binding post 33, wire 56, lever 29, armature 19, wire 55, insulated binding post 32, and wire 57 to the battery. Lever 29 is normally pressed toward the right at its upper end by spring 34, but as armature 19 is drawn toward the poles of the magnet, lever 29 is limited in its movement (breaking contact at 30), by arm 35 coming into contact with contact member 36 (insulated from the bracket in which it is mounted), such contact member having connection by means of binding post 37 with wire 58 arranged to cut out one of the cells or groups of cells of the battery. Sufficient current is supplied by the remaining cell or cells to cause magnet 16 to continue to attract its armature. This is an important feature of my invention, since the amount of battery current consumed in the operation of the device is reduced to a minimum.

In order that the valve may be controlled from any desired point, as above indicated, push button 39 is arranged to control magnets 17 and 18 located respectively on either side of magnets 16. Magnet 17 is provided with an armature 21 consisting of a semicircular plate, as shown more clearly in Fig. 6, and magnet 18 has a similar armature 20, the two armatures being connected by means of brass members 22 pivoted in bearings carried by spring arms 23. These spring arms are secured to the casing and may be adjusted by means of screws 23'. Catches 28 are secured to the armature 19 at each side as indicated in Fig. 10 and are insulated from the armature, these catches being arranged to engage with catches 27 mounted on the members 22. By means of this construction the diaphragm is located in a given position or rather in such position that the flow of gas will be interrupted through the main passage when the magnet 16 is excited and magnet 18 is simultaneously excited, the diaphragm being first thrown inwardly and toward the right as shown in Fig. 5, and then locked by means of devices 27 and 28. This operation takes place when push button 41 is temporarily pressed for the purpose of cutting off the main supply of gas to the burner. The pressing of button 41 causes the circuit to be completed from the battery through wire 62, magnet 18, magnet 16, wire 52, wire 56, lever 29, armature 19, wire 55, wire 57 to the battery.

When button 40 is pressed for the purpose of opening the valve and illuminating the sign, the circuit is completed through wire 60, magnet 17 and wire 61, to the battery. This operates armature 21 and disengages catches 27 and 28 thus allowing the diaphragm to assume its normal position and providing the necessary supply of gas which is then automatically diminished intermittently by the operation of the thermo-electric switch as described.

In the modification shown in Fig. 11 the main supply pipe 8 has two branch pipes $8^a$ and $8^b$ connected therewith, each of these branch pipes being supplied with valves 13 numbered respectively 42 and 43, valve 43 being similar to the valve previously described for controlling the supply of gas to the burner, with the exception that the supplemental magnets are not illustrated. Valve 42 consists of a casing 44 formed like that of the valve first mentioned, except that the partition wall 45 between the chambers of the valve projects sufficiently to cause the diaphragm 46 when in its normal position to cut off communication between chambers 47 and 48 and thus cut off the main supply of gas to the burner 49. When the magnets 16' are excited, causing valve 43 to close, thereby cutting off the main supply of gas to burner 49', the diaphragm 46 of valve 42 is opened by means of a device connecting the two valves. By this means gas is supplied through the main passageways of the valves first to one burner and then to the other. These burners may be provided with chimneys of glass having different colors, so that the sign may be illuminated constantly, first in one color then in another. The plate or armature 19ª mounted on diaphragm 19' of the valve 43 carries ears 90, these ears being connected to the forked arm of member 91 fitted with the threaded sleeve 92, the latter engaging the threaded end of another forked member 93 connected with the plate 94 secured to diaphragm 46.

The valve diaphragms in the principal and modified forms are of rubber, and the device is practically noiseless in operation.

I claim:

1. In a device of the class described, a casing arranged to receive a transparent sign, means for illuminating the sign, means for controlling the supply of gas to the illuminating means, such means last mentioned including an electrically operated valve, a plurality of magnets for controlling the valve, a thermo-electric switch for controlling the circuits connected with the magnets, and an adjustable shutter located between the thermo-electric switch and the illuminating means.

2. In a device of the class described, a casing arranged to receive a transparent sign, means for illuminating the sign, a valve for controlling the supply of gas to the illuminating means, such valve including an elastic diaphragm, an armature carried by the diaphragm, a magnet for controlling the armature and diaphragm, said diaphragm being disposed between the armature and magnet, and thermo-electric means associated with the illuminating means, for controlling the magnet.

3. In a device of the class described, a casing arranged to receive a transparent sign, means for illuminating the sign, means for controlling the supply of gas to the illuminating means, said means comprising a valve, a diaphragm for controlling the passage of gas through the valves, an armature carried by the diaphragm, and a plurality of electro-magnets for independently controlling the movement of the diaphragm.

4. In a device of the class described, a casing arranged to receive a transparent sign, means for illuminating the sign, a valve controlling the supply of gas to the illuminating means, a diaphragm for controlling the passage of gas through said valve, means for controlling the movement of the diaphragm, means for locking the diaphragm in given position, and a plurality of electro-magnets, one of which is arranged to lock the diaphragm and the other to free said diaphragm from its locked position, and a thermo-electric switch controlling certain of the magnets.

5. In a device of the class described, a sign illuminating device, means for controlling the supply of gas to said device, means permitting a continuous flow of a limited quantity of gas to said device, a thermo-electric switch in circuit with the gas controlling device, and a shutter arranged between the illuminating device and said switch.

6. In a device of the class described, a sign illuminating device, a valve for controlling the supply of gas thereto, a diaphragm for controlling the supply of gas through the valve, and an armature carried by such diaphragm, a magnet for controlling the movement of the diaphragm, and a plurality of supplemental magnets coöperating with the magnet first mentioned in the control of such diaphragm.

7. In a device of the class described, a sign illuminating device, a valve controlling the supply of gas thereto, a thermo-electric switch in circuit with the valve, a diaphragm controlling the passage of gas through said valve, a magnet for intermittently closing the valve by the operation of the diaphragm and means for securing said diaphragm at times in a given position.

8. In a device of the class described, a sign illuminating device, a valve for controlling the supply of gas thereto, means for permitting the flow of a limited quantity of gas to the illuminating device when the principal gas passage-way is closed, a diaphragm for controlling the main passage-way through such valve, an armature carried by the diaphragm, locking means carried by the armature, a plurality of armatures independently mounted, a coöperative locking device carried thereby, and a plurality of magnets for operating the armatures last mentioned independently.

9. In a device of the class described, a sign illuminating device, an electrically operated valve controlling the supply of gas thereto, a thermo-electric switch in circuit with the valve, and arranged to cause the intermittent closing of the valve under given conditions, and electric governing means manually operated from a distant point and arranged to lock the valve and to release the latter permitting its control by the thermo-electric switch.

10. In a device of the class described, a gas supply pipe formed with a plurality of branch pipes, a valve in each of said branch pipes permitting a constant flow of gas, separate means in each of the valves for providing an independent supply of gas, such means in one of the valves being electrically controlled, and a device connecting the electrically controlled valve with the remaining valve and arranged to cause the opening of the latter mechanically when the electrically controlled valve is closed.

11. In a device of the class described, a gas supply pipe formed with a plurality of branch pipes, a valve in each of said branch pipes permitting a constant flow of gas, separate means in each of the valves for providing an independent supply of gas, such means in one of the valves being electrically controlled, and an adjustable rod connecting the electrically controlled valve with the remaining valve and arranged to cause the opening of the latter mechanically when the electrically controlled valve is closed.

12. In a device of the class described, means arranged to receive a transparent sign, means for illuminating the sign, means for controlling the supply of gas to the illuminating means, said controlling means including a valve, an armature connected with the movable member of such valve, a magnet for operating the armature and movable valve member, independent electrically operated mechanism for locking such armature and movable valve member, and separate means for releasing the valve member.

13. In a device of the class described, means arranged to receive a transparent sign, means for illuminating the sign, means for controlling the supply of gas to the illuminating means, said controlling means including a thermo-electric switch, a valve, an armature connected with the movable member of such valve, a magnet for operating the armature and movable valve member, a second magnet, and mechanism associated therewith for locking such armature and movable valve member, and separate means for releasing the valve member.

In testimony whereof I affix my signature in presence of two witnesses.

HENRY G. SUTTON.

Witnesses:
WM. D. CROMMIE,
ROBERT E. FABIAN.